United States Patent
Zavadsky et al.

(10) Patent No.: US 8,306,563 B2
(45) Date of Patent: Nov. 6, 2012

(54) METHOD AND APPARATUS FOR MUTING A DIGITAL LINK IN A DISTRIBUTED ANTENNA SYSTEM

(75) Inventors: Dean Zavadsky, Shakopee, MN (US); Jeffrey J. Cannon, Victoria, MN (US); John M. Hedin, Coon Rapids, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 528 days.

(21) Appl. No.: 12/643,116

(22) Filed: Dec. 21, 2009

(65) Prior Publication Data

US 2010/0190519 A1 Jul. 29, 2010

Related U.S. Application Data

(60) Provisional application No. 61/148,256, filed on Jan. 29, 2009.

(51) Int. Cl.
H04B 7/00 (2006.01)
(52) U.S. Cl. ......................... 455/522; 455/67.11; 455/69
(58) Field of Classification Search .................. 455/522, 455/67.11, 68–70, 115.3, 126, 127.1, 127.2, 455/135, 226.3, 277.2, 296, 550.1, 92, 151.1, 455/352; 370/318; 340/426.13, 310.11, 340/815.6
See application file for complete search history.

(56) References Cited

U.S. PATENT DOCUMENTS

| | | | |
|---|---|---|---|
| 4,183,054 A | 1/1980 | Patisaul et al. | |
| 4,611,323 A | 9/1986 | Hessenmüller | |
| 4,628,501 A | 12/1986 | Loscoe | |
| 4,654,843 A | 3/1987 | Roza et al. | |
| 4,691,292 A | 9/1987 | Rothweiler | |
| 4,999,831 A | 3/1991 | Grace | |
| 5,193,109 A | 3/1993 | Lee | |
| 5,229,850 A * | 7/1993 | Toyoshima | 348/153 |
| 5,243,598 A | 9/1993 | Lee | |
| 5,321,849 A | 6/1994 | Lemson | |

(Continued)

FOREIGN PATENT DOCUMENTS
EP  0391597  10/1990
(Continued)

OTHER PUBLICATIONS

Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.

(Continued)

Primary Examiner — Dominic E Rego
(74) Attorney, Agent, or Firm — Fogg & Powers LLC

(57) ABSTRACT

System and methods for muting a digital link in a distributed antenna system are provided. In one embodiment, a device for processing signals a distributed antenna system (DAS) is provided. The device comprises: a first signal path for transporting digital data signals; a controller for monitoring events affecting the first signal path; and a muting module coupled to the controller, wherein the muting module controls muting of a signal power of the first signal path as directed by the controller. The muting module applies a hard clamping to mute the signal power of the first signal path when the controller identifies an unplanned event. The muting module applies a ramp to mute the signal power of the first signal path when the controller identified a planned event.

27 Claims, 12 Drawing Sheets

U.S. PATENT DOCUMENTS

| | | | |
|---|---|---|---|
| 5,339,184 A | 8/1994 | Tang | |
| 6,016,352 A * | 1/2000 | Barmore | 381/94.5 |
| 7,043,208 B2 * | 5/2006 | Nigra | 455/78 |
| 7,177,606 B2 * | 2/2007 | Chen | 455/126 |
| 8,160,272 B1 * | 4/2012 | Blackburn et al. | 381/94.5 |
| 2005/0083115 A1 * | 4/2005 | Risbo | 330/10 |
| 2005/0085743 A1 * | 4/2005 | Hacker et al. | 600/554 |
| 2005/0215284 A1 * | 9/2005 | Su et al. | 455/556.2 |
| 2007/0116300 A1 * | 5/2007 | Chen | 381/92 |
| 2008/0211565 A1 * | 9/2008 | Shimomura et al. | 327/389 |
| 2009/0067263 A1 * | 3/2009 | Choi | 365/189.09 |
| 2009/0116578 A1 * | 5/2009 | Sperlich et al. | 375/285 |
| 2009/0160547 A1 * | 6/2009 | Shankar et al. | 330/10 |
| 2010/0019820 A1 * | 1/2010 | Pai et al. | 327/290 |
| 2010/0158278 A1 * | 6/2010 | Larsen et al. | 381/120 |

FOREIGN PATENT DOCUMENTS

| | | |
|---|---|---|
| WO | 9115927 | 10/1991 |

OTHER PUBLICATIONS

Harvey et al., "Cordless Communications Utilising Radio Over Fibre Techniques for the Local Loop", "IEEE International Conference on Communications", Jun. 1991, pp. 1171-1175, Publisher: IEEE.

* cited by examiner

METHOD AND APPARATUS FOR MUTING A DIGITAL LINK IN A DISTRIBUTED ANTENNA SYSTEM

CROSS-REFERENCE TO RELATED APPLICATIONS

This application claims the benefit of U.S. Provisional Application Ser. No. 61/148,256, entitled "METHOD AND APPARATUS FOR MUTING A DIGITAL LINK IN A DISTRIBUTED ANTENNA SYSTEM" filed on Jan. 29, 2009, which is hereby incorporated herein by reference.

BACKGROUND

A Distributed Antenna System (DAS) is a network of spatially separated antenna nodes connected to a common node via a transport medium that provides wireless service within a geographic area or structure. Common wireless communication system configurations employ a host unit as the common node, which is located at a centralized location (for example, at a facility that is controlled by a wireless service provider). The antenna nodes and related broadcasting and receiving equipment, located at a location that is remote from the host unit (for example, at a facility or site that is not controlled by the wireless service provider), are also referred to as "remote units." Radio frequency (RF) signals are communicated between the host unit and one or more remote units. In such a DAS, the host unit is typically communicatively coupled to one or more base stations (for example, via wired connection or via wireless connection) which allow bidirectional communications between wireless subscriber units within the DAS service area and communication networks such as, but not limited to, cellular phone networks, the public switch telephone network (PSTN) and the Internet. A DAS can provide, by its nature, an infrastructure within a community that can scatter remote units across a geographic area for providing wireless services across that area.

A DAS having a digital transport for the downlink and uplink transport signals sent between the host unit and the remote units has many advantages over a DAS having an analog transport. Digitizing the downlink and uplink RF signals, however, may introduce unwanted effects into the RF signal.

SUMMARY

System and methods for muting a digital link in a distributed antenna system are provided. In one embodiment, a device for processing signals a distributed antenna system (DAS) is provided. The device comprises: a first signal path for transporting digital data signals; a controller for monitoring events affecting the first signal path; and a muting module coupled to the controller, wherein the muting module controls muting of a signal power of the first signal path as directed by the controller. The muting module applies a hard clamping to mute the signal power of the first signal path when the controller identifies an unplanned event. The muting module applies a ramp to mute the signal power of the first signal path when the controller identified a planned event.

DRAWINGS

Understanding that the drawings depict only exemplary embodiments of the present invention and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments of the present invention.

DETAILED DESCRIPTION

The present disclosure is directed towards a method and apparatus for muting a signal path in an RF communications path. The signal path may be muted for a number of reasons including: protection of RF amplifiers in the signal path, compliance with FCC regulations, or protection from "out of frequency" signals. In one embodiment, to mute the signal path, one or more of the amplifiers in the signal path are set to output zero power. This effectively eliminates any signal being output from the signal path.

Figure 1:
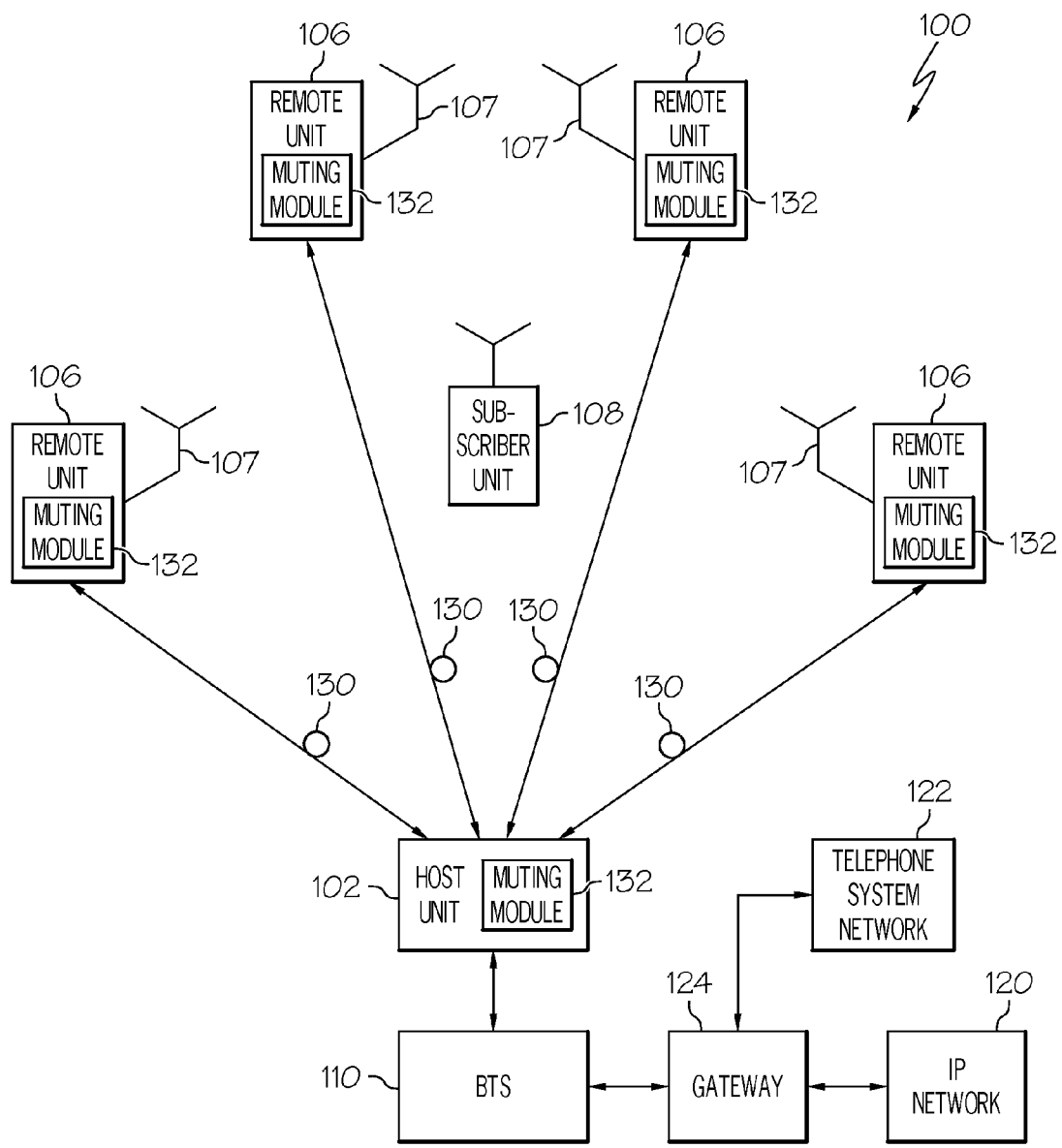
FIG. 1 is a block diagram of one embodiment of a distributed antenna system (DAS) including a host unit and a plurality of remote units.

FIG. 1 is a block diagram of one embodiment of a distributed antenna system (DAS) 100. DAS 100 includes a host unit 102 and a plurality of remote units 106. At the physical layer, host units 102 and remote units 106 are communicatively coupled via a communication link 130 to form a bidirectional communication network comprising a plurality of point-to-point communication links 130. In one embodiment, one or more of communication links 130 are fiber optic cable as indicated in FIG. 1. Optionally, host units 102 and remote units 106 may be interconnected via coaxial cable, or a combination of both coaxial cable and fiber optic cable. Additionally, in other embodiments, one or more of communication links 130 are wireless millimeter wave links (e.g. E Band/70 GHz radio). Here a millimeter signal transceiver is coupled to host unit 102 and each remote unit 106 on each end of communication link 130. In yet another embodiment, one or more of communication links 130 a microwave radio links where microwave radio transceivers are coupled to host unit 102 and remote units 106.

Remote units 106 each house electronic devices and systems used for wirelessly transmitting and receiving modulated radio frequency (RF) communications via antenna 107 with one or more mobile subscriber units 108. Host unit 102 is coupled to at least one base transceiver station (BTS) 110 often referred to as a base station. BTS 110 communicates voice and other data signals between the respective host unit 102 and a larger communication network via a gateway 124 coupled to a telephone system network 122 (for example, the public switched telephone network and/or wireless service provider networks) and an internet protocol (IP) network 120, such as the Internet. In one embodiment, DAS 100 comprises part of a cellular telephone network and subscriber units 108 are cellular telephones.

Downlink RF signals are received from the BTS 110 at the host unit 102, which the host unit 102 uses to generate one or more downlink transport signals for transmitting to one or more of the remote units 106. Each such remote unit 106 receives at least one downlink transport and reconstructs the downlink RF signals from the downlink transport signal and causes the reconstructed downlink RF signals to be radiated from a remote antenna 107 coupled to or included in that remote unit 106. A similar process is performed in the uplink direction. Uplink RF signals received at one or more remote units 106 from subscriber 108 are used to generate respective uplink transport signals that are transmitted from the respective remote units 106 to the host unit 102. The host unit 102 receives and combines the uplink transport signals transmitted from the multiple remote units 106. The host unit 102 communicates the combined uplink RF signals to the BTS 110 over a broadband signal.

DAS 100 comprises a digital DAS transport meaning that the downlink and uplink transport signals transmitted between host unit 102 and remote units 106 over communication links 130 are generated by digitizing the downlink and uplink RF signals, respectively. In other words, the downlink and uplink transport signals are not analog RF signals but instead are digital data signals representing digital RF samples of a modulated RF signal. For example, if a particular communication signal destined for transmission to subscriber unit 108 is a modulated RF signal in the 900 MHz band, then host unit 102 will generate baseband digital samples of the modulated 900 MHz RF signal from BTS 110, which are then distributed by host unit 102 to the remote units 106. Alternatively, an all-digital BTS may generate baseband digital samples directly. At the remote units, the digital samples of the modulated RF signal are converted from digital into an analog RF signal to be wirelessly radiated from the antennas 107. In the uplink analog RF signals received at remote unit 106 are digitally sampled to generate digital RF data samples for the uplink transport signals. BTS 110, host unit 102 and remote units 106 each accommodate processing communication signals for multiple bands and multiple modulation schemes simultaneously.

Each remote unit 106 comprises a muting module 132 configured to mute a signal path in the respective remote unit 106. Muting modules 132 are configured to mute either uplink or downlink communications. When a muting module 132 mutes signals in the downlink direction, no signals are transmitted from the associated antenna 107. Likewise when a muting module 132 mutes signals in the uplink direction, no signals are sent from the associated remote unit 106 to host unit 102. Host unit 102 also comprises at least one muting module 132. More detail regarding muting modules 132 is provided below.

Figure 2:
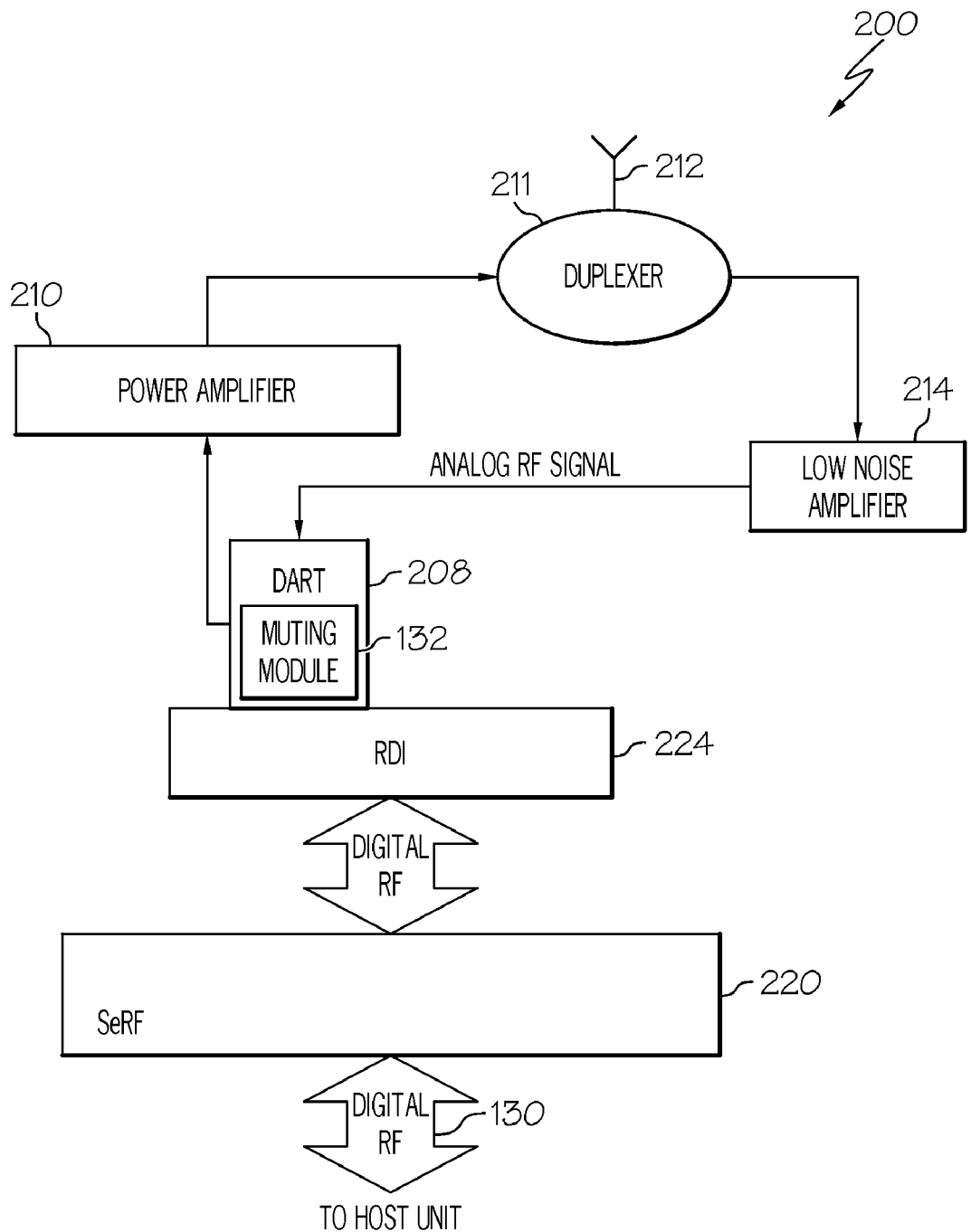
FIG. 2 is a block diagram of one embodiment of a remote unit of FIG. 1.

FIG. 2 is a block diagram of one embodiment of a remote unit 106. Remote unit 106 includes a serial radio frequency (SeRF) module 220, a digital to analog radio frequency transceiver (DART) module 208, a remote DART interface board (RDI) 224, a power amplifier 210, antenna 212, a duplexer 211, a low noise amplifier 214. In one embodiment, SeRF modules and DART modules described herein are realized using FPGAs, ASICs, digital signal processing (DSP) boards, or similar devices.

DART module 208 provides bi-directional conversion between analog RF signals and digital sampled RF for the downlink and uplink transport signals transmitted between host unit 102 and remote units 106. In the uplink, antenna 212 receives a wireless RF signal from subscriber 208 and passes the RF signal to DART module 208 via low noise amplifier 214. DART module 208 receives the incoming analog RF signal and samples the analog RF signal to generate a digital data signal for use by SeRF module 220. In the downlink, DART module 208 receives digital sampled RF data from SeRF module 220, up converts the sampled RF data to a broadcast frequency, and converts the digital RF samples to analog RF for wireless transmission. After a signal is converted to an analog RF signal by DART module 208, the analog RF signal is sent to power amplifier 210 for broadcast via antenna 212. Power amplifier 210 amplifies the RF signal received from DART module 208 for output through duplexer 211 to antenna 212. Duplexer 211 provides duplexing of the signal which is necessary to connect transmit and receive signals to a common antenna 212. In one embodiment, low noise amplifier 214 is integrated into duplexer 211. One of ordinary skill in the art upon reading this specification would appreciate that DART modules may function to optionally convert the digital RF samples into intermediate frequency (IF) samples instead of, or in addition to, baseband digital samples. DART module 208 also comprises a muting module 132 for muting either or both of the uplink and downlink signal paths through DART module 208.

DART modules in a remote unit are specific for a particular frequency band. A single DART module operates over a defined FDD band regardless of the modulation technology being used. Thus frequency band adjustments in a remote unit can be made by replacing a DART module covering one frequency band with a DART module covering a different frequency band. For example, in one implementation DART module 208 is designed to transmit 850 MHz cellular transmissions. As another example, in another implementation DART module 208 transmits 1900 MHz PCS signals. Some of the other options for a DART module 208 include Nextel 800 band, Nextel 900 band, PCS full band, PCS half band, BRS, WiMax, Long Term Evolution (LTE), and the European GSM 900, GSM 1800, and UMTS 2100. By allowing different varieties of DART modules 208 to be plugged into RDI 224, remote unit 106 is configurable to any of the above frequency bands and technologies as well as any new technologies or frequency bands that are developed.

SeRF module 220 provides bi-directional conversion between a digital data stream and a high speed optical serial data stream. In the uplink, SeRF module 220 receives incoming digital data streams from DART module 208 and sends a serial optical data stream over communication link 130 to host unit 102. In the downlink, SeRF module 202 receives an optical serial data stream from host unit 102 and provides a digital data stream to DART module 208.

SeRF module 220 is coupled to RDI 224. RDI 224 has a plurality of connectors each of which is configured to receive a pluggable DART module 208 and couple DART module 208 to SeRF module 220. RDI 224 is a common interface that is configured to allow communication between SeRF module 220 and different varieties of DART modules 208. In this embodiment, RDI 204 is a passive host backplane to which SeRF module 220 also connects. In another embodiment, instead of being a host backplane, RDI 224 is integrated with SeRF module 220.

Although FIG. 2 illustrates a single DART module coupled to a SeRF module, a single remote unit housing may operate over multiple bands by possessing multiple DART modules. In one such embodiment, RDI 224 provides separate connection interfaces allowing each DART module to communicate RF data samples with SeRF module 220. Here, SeRF module 220 allows multiple DART modules to operate in parallel to communicate high speed optical serial data streams over a communication link with the host unit. In one such embodiment a SeRF module actively multiplexes the signals from multiple DART modules (each DART module processing a different RF band) such that they are sent simultaneously over a single transport communication link. In one embodiment a SeRF module presents a clock signal to each DART module to which it is coupled to ensure synchronization.

Furthermore, although FIG. 2 illustrates a single SeRF module connected to a single RDI, embodiments of the present invention are not limited as such. In alternate embodiments, a SeRF module may connect to multiple RDIs, each of which can connect to multiple DARTS. For example, in one embodiment, a SeRF module can connect to up to 4 RDIs, each of which can connect to up to 2 DARTs. SeRF module 220 provides bi-directional conversion between a serial stream of RF, IF or baseband data samples (a SeRF stream) and a high speed optical serial data stream. In the uplink direction, SeRF module 220 receives an incoming SeRF stream from DART modules 208 and sends a serial optical data stream over communication links 130 to host unit 102. In the downlink direction, SeRF module 220 receives an optical serial data stream from host unit 102 and provides a SeRF stream to DART modules 208. The present discussion applies to such multiple band remote units, even though the present examples focus on the operation of a single DART module for simplicity.

Figure 3:
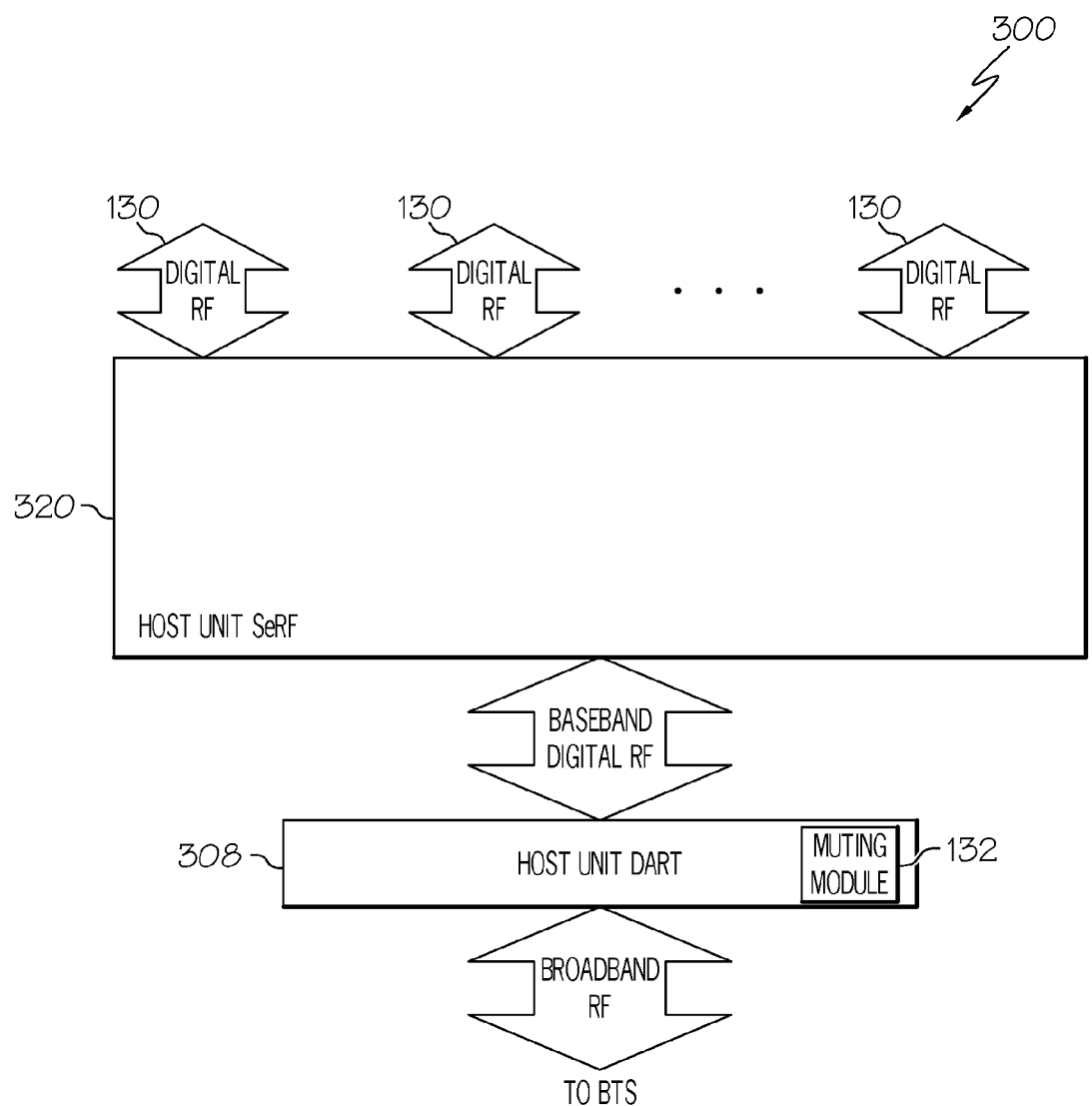
FIG. 3 is a block diagram of one embodiment of a host unit of FIG. 1

FIG. 3 is a block diagram illustrating one embodiment of a host unit (shown generally at 102). Host unit 102 is communicatively coupled to multiple remote units 106 via communication links 130, as described with respect to FIG. 1, to form a digital DAS. Host unit 102 includes a host unit digital to analog radio frequency transceiver (DART) module 308 and a host unit serial radio frequency (SeRF) module 320. SeRF module 320 provides bi-directional conversion between a digital RF data samples and the multiple high speed optical serial data streams to and from the remote units 106. In the uplink direction, SeRF module 320 receives incoming serial optical data streams from a plurality of remote units and converts each into a stream of digitized baseband RF data samples, which are summed into a broadband stream of RF data samples. DART module 308 provides a bi-directional interface between SeRF module 320 and one or more base stations, such as BTS 110. As with remote units 106, when host unit 320 operates over multiple bands with multiple base stations, a separate DART module 308 is provided for each frequency band. Each DART module 308 also comprises a muting module 132 for muting either or both of the uplink and downlink signal paths through the DART module 308.

Figure 4:
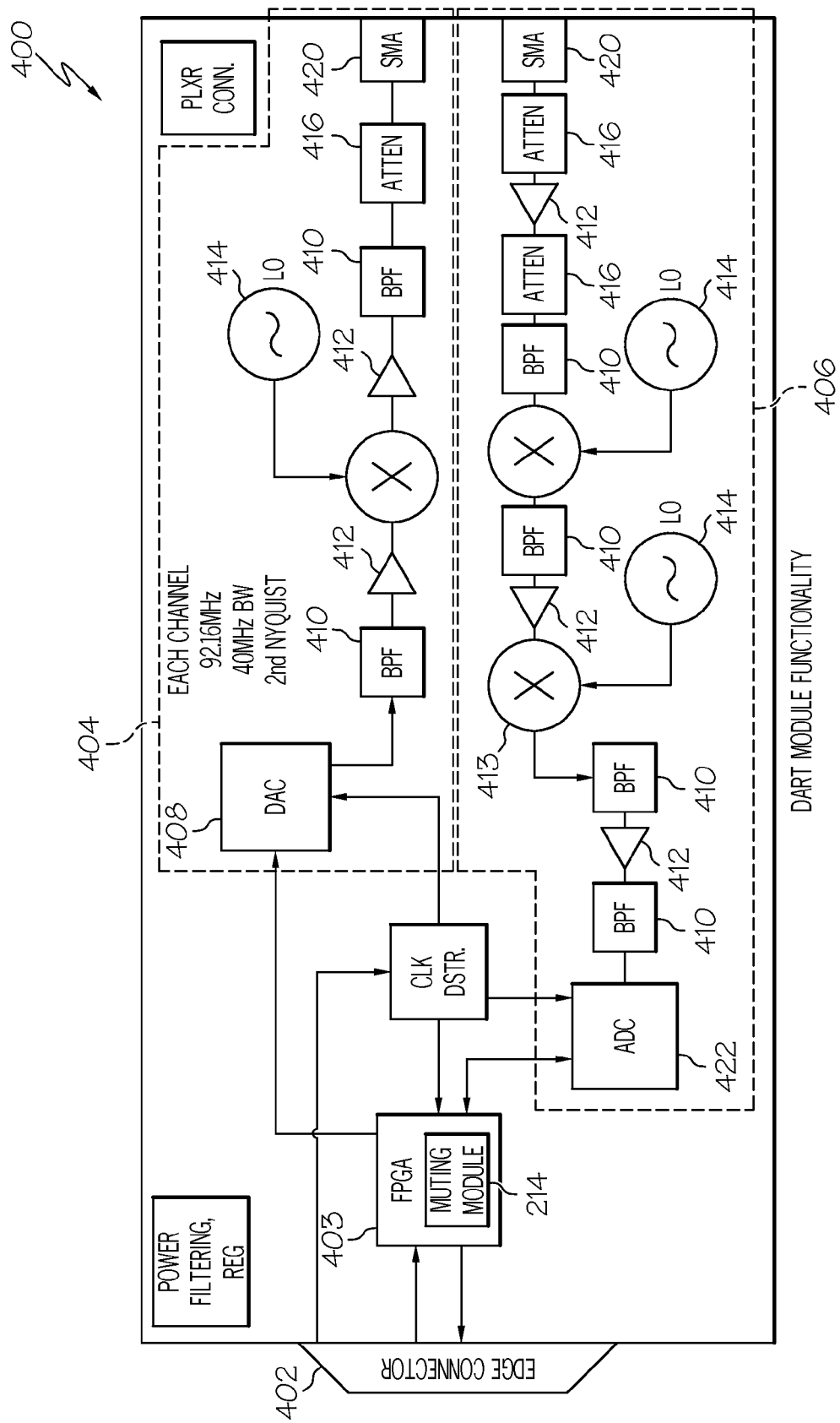
FIG. 4 illustrates a schematic view of one embodiment of a DART module for using in either the host unit of FIG. 2 or the remote unit of FIG. 3.

FIG. 4 is a block diagram of one embodiment of a DART module 400 for use in either host unit 102 (DART module 308) or remote units 106 (DART module 208). DART module 400 has two main signal paths; a transmission path 404 and a reception path 406. For signals received from a SeRF module, DART module 400 forms parallel digital RF data from the incoming data stream, if needed, at FPGA 403. In this embodiment, FPGA 403 is a logic device that is programmed to convert serial digital data into RF sampled data and programmed to convert RF sampled data into serial digital data. DART module 400 then converts the digital RF data to an analog signal with digital to analog converter (DAC) 408. Transmission path 404 continues as DART module 400 filters, amplifies and up-converts the analog signal for RF transmission with an assortment of filters 410, amplifiers 412, an oscillator 414, and an attenuator 416. The transmission path exits DART module 400 at a subminiature version A RF coaxial connector (SMA) connector 420. The signals travel in the opposite direction down reception path 406, where they are converted from analog to digital and sent to a SeRF module. First signals are received at SMA connector 420. DART module 400 then amplifies, down-converts, filters the incoming RF signal with a plurality of filters 410, amplifiers 412, oscillators 414, and attenuators 416. DART module 400 then digitizes the signal with analog to digital converter 422. FPGA 403 then provides the data stream as parallel digital RF sampled data to a SeRF module. More detail regarding DAS 100, host unit 102, remote units 106, or DART modules 400 is provided in co-pending U.S. application Ser. No. 11/627,251 which is hereby incorporated herein by reference.

DART module 400 also comprises a muting module 132. During certain situations, one or both signal paths (i.e. receive path 406 and transmit path 404) of DART module 400 are muted by muting module 132 to prevent further transport of RF signals. For example, if there is an error in a hardware component on DART module 400. One error which may occur is a synthesizer for the signal path becoming unsynchronized. An unsynchronized synthesizer can cause transmissions from the signal path to be placed on incorrect frequencies. Signals on incorrect frequencies can cause many problems, especially in a multi-carrier system where the incorrect frequency may overlap with a frequency already being transmitted on. Additionally, the signal path may be muted because of a scheduled change in DAS 100 in which invalid data is sent through DAS 100. Another reason is to prevent damage to power amplifiers 412 within DART module 400 caused by abnormalities in the signal. Other causes for muting the signal path include changes in a communication link 130 between host unit 102 and remote units 106, re-configuration of time slots, excessive bit errors in the received data, management of an overflow situation, an unsynchronized synthesizer, or other situations. Finally, in one embodiment, all signals are muted which may cause DART module 400 to transmit above limits imposed by the FCC. Causes for muting a signal path are referred to herein as "events".

As mentioned above, for any of these events muting module 132 may mute either receive path 406, transmit path 404 or both. In one embodiment, muting module 132 mutes a signal path by setting the output power of one or more amplifiers in the signal path to zero. While the amplifier is muted, no (or very little) signal is sent from the signal path.

As shown in FIG. 4, muting module 132 is a functional component of FPGA 403. In other words, in this embodiment, muting module 132 is built in to the functionality of the FPGA 403. FPGA 403, however, also performs other functionalities. In an alternative embodiment, muting module 132 is a stand alone component, including for example, an inline component in each signal path. Thus, in this alternative embodiment, DART module 403 comprises two muting modules 132, one in each signal path. In still other embodiments, muting module 132 is functionality built into software operating on a processor on DART module 400.

Figure 5A:
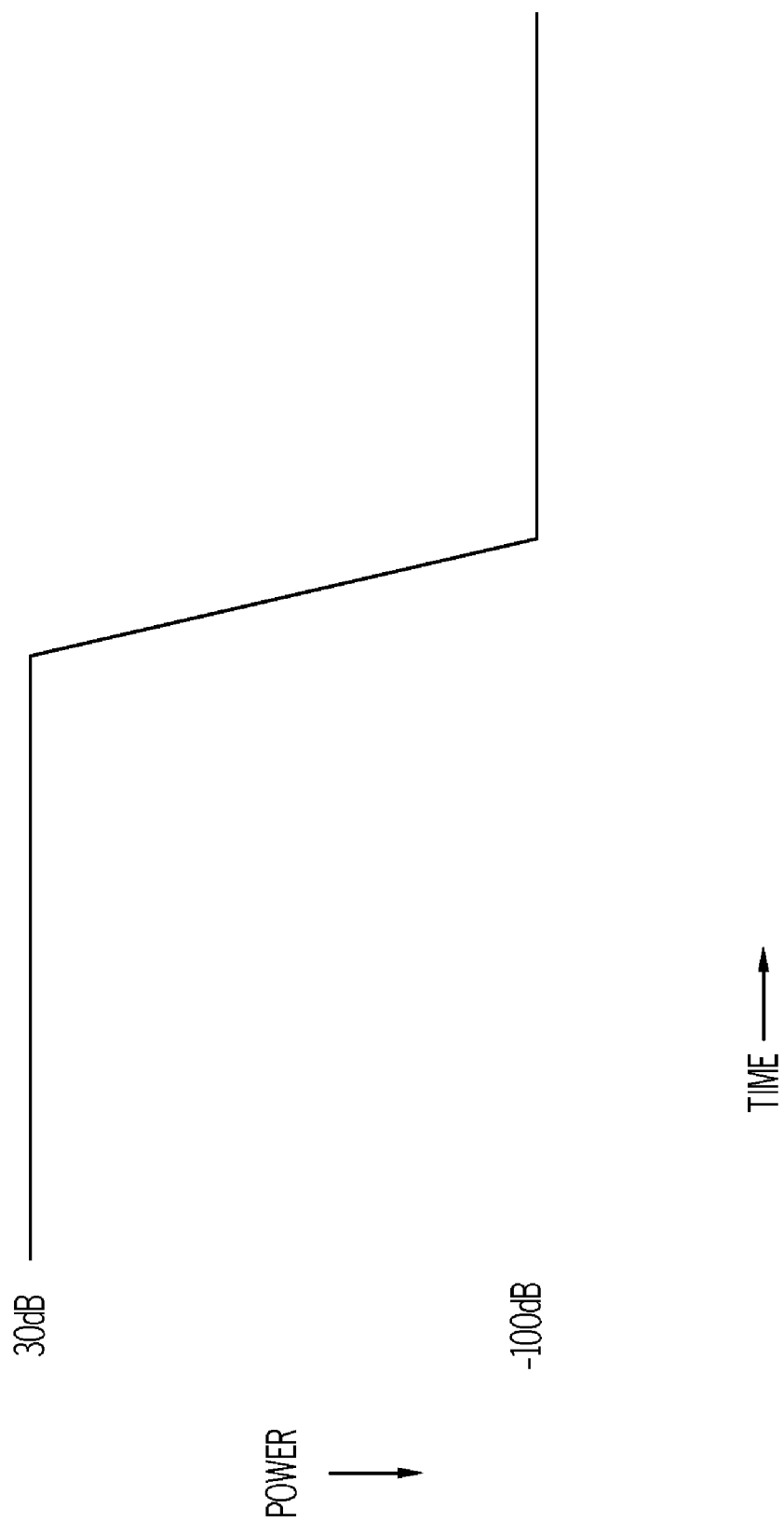
FIG. 5A is a graph of one embodiment of a clamped down output signal.

One method of muting a signal path with muting module 132 is referred to herein as "hard clamping" the signal path. Hard clamping the signal is typically used when an unplanned event occurs in either incoming data or in hardware of DART module 104. Hard clamping shuts the signal path off quickly by setting the power of an amplifier directly from its current power level to zero (or near zero). For example, when muting module 132 recognizes that an event has occurred involving a hardware component on DART module 400, muting module 132 quickly shuts down the power on the signal path comprising that hardware component. Muting module 132 mutes the power by setting the power amplifiers 412 in the signal path from a normal (or current) operating state to zero power. FIG. 5A shows one embodiment of an output signal during a hard clamp. As shown in FIG. 5A, the signal is moved quickly from 30 dB to −100 dB.

In some situations, muting module 132 recognizes an event and analyzes the event to determine whether to mute a signal line. For example, in some situations muting module 132 sends a report to software operating on host unit 102 and host unit 102 determines whether to mute the signal path. If host unit 102 determines that the signal path should be muted, host unit 102 sends a signal to muting module 132 to mute the signal path. To determine when an event has occurred, certain hardware components provide status bits identifying the status of the hardware component to muting module 132. Muting module 132 monitors these status bits to determine when an event has occurred with the hardware components.

In one embodiment, instead of muting by changing the power of the amplifier, one or more attenuators are used to reduce the power level of the signal. Furthermore, in other embodiments, other methods are used to reduce the power level of the signal.

Figure 5B:
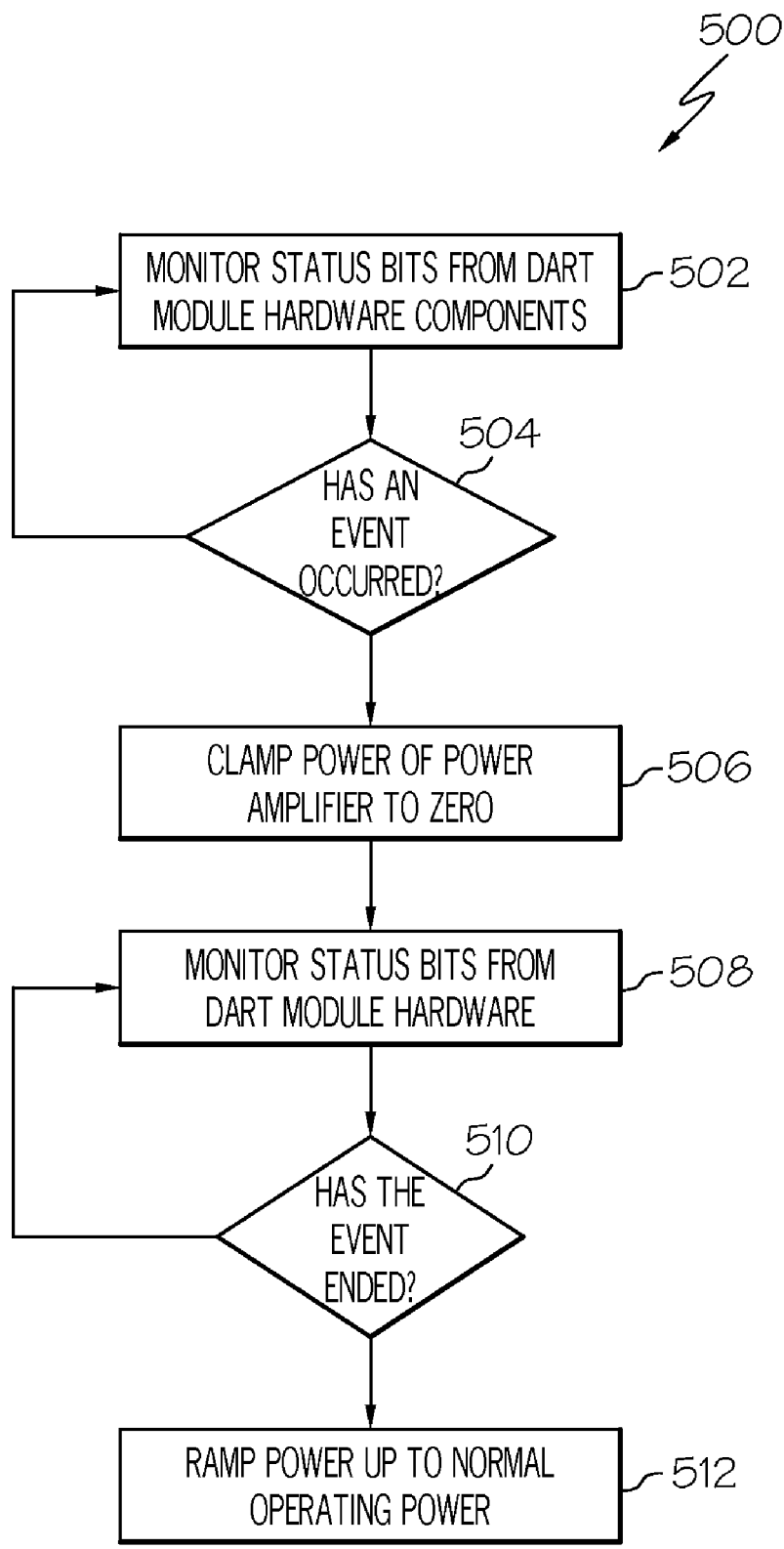
FIG. 5B is a flow chart illustrating one embodiment of a method of muting a signal path in the DART module of FIG. 4.

FIG. 5B illustrates one embodiment of a method 500 of hard clamping a signal path. During operation of DART module 400, muting module 132 monitors the status bits from hardware components of DART module 400 (502). When a synthesizer (for example) is out of synchronization with DAS 100, muting module 132 recognizes this in the status bit sent from the synthesizer (504). An out of synch synthesizer can cause signals transmitted from DART module 400 to be transmitted in incorrect frequencies. Once muting module 132 recognizes that an event has occurred, muting module 132 quickly sets amplifiers 412 in the synthesizer's signal path (e.g. transmit path 404) to zero power (506). Thus, unwanted effects caused by the synthesizer in the output signal are reduced.

Once the signal path has been muted, muting module 132 monitors the event that caused the signal path to be muted (508). When the event is no longer present (510), muting module 132 ramps the power back up to the normal operating power (512). For example, an unsynchronized synthesizer event may be corrected through normal periodic re-synchronization of DART module 400. In some embodiments, muting module 132 holds for a specified amount of time after an event is no longer present to monitor the event and ensure that the system is stable.

For example, if muting module 132 recognizes excessive bit errors in signals received, FPGA 403 assumes there is an error with upstream communication link 130 or host unit 102, and mutes transmit path 404 to prevent incorrect data from being transmitted. Once muting module 132 has muted transmit path 404, muting module 132 monitors the incoming bit stream to determine when the bit error rate is no longer excessive. Muting module 132 determines the incoming bit stream rate is no longer excessive when the bit error rate has dropped below a threshold. Once the bit error rate in the incoming bit stream has dropped below the threshold and, therefore, the event is no loner present, muting module 132 continues to monitor the incoming bit stream before ramping up the power of the power amplifier. Muting module 132 monitors the incoming bit stream until the bit error rate remains below the threshold for a defined amount of time (e.g. 5 frames). Once the bit error rate is below the threshold for the defined amount of time, muting module 132 ramps the power up on the power amplifier to resume transmission of data.

To ramp up the power, muting module 132 incrementally steps up the power from zero until normal operating power is reached. Ramping up of the power may occur, for example, over half of a millisecond in time. For example, in one embodiment the power amplifier is stepped up in 5 dB increments from −100 dB to 30 dB with 200 microsecond steps. Thus, at 200 microseconds in time, the power is stepped from 0 dB to 5 dB. At 400 microseconds the power is stepped from 5 dB to 10 dB and so on until the power is at 30 dB. In one embodiment, stepping up the power of power amplifier refers to the peak power of the amplifier. Thus, when the amplifier is set to 10 dB, all incoming signals are clamped at 10 dB, such that any signal above 10 dB is only amplified to 10 dB by the power amplifier. In other embodiments, other steps sizes, times, or methods of ramping up the power of power amplifier are used. The ramp up is similar (except in the opposite direction) to the ramp down described below and shown in FIGS. 6A and 6B. Thus, as described below, in an alternative embodiment, the ramp up is smooth.

Figure 6A:
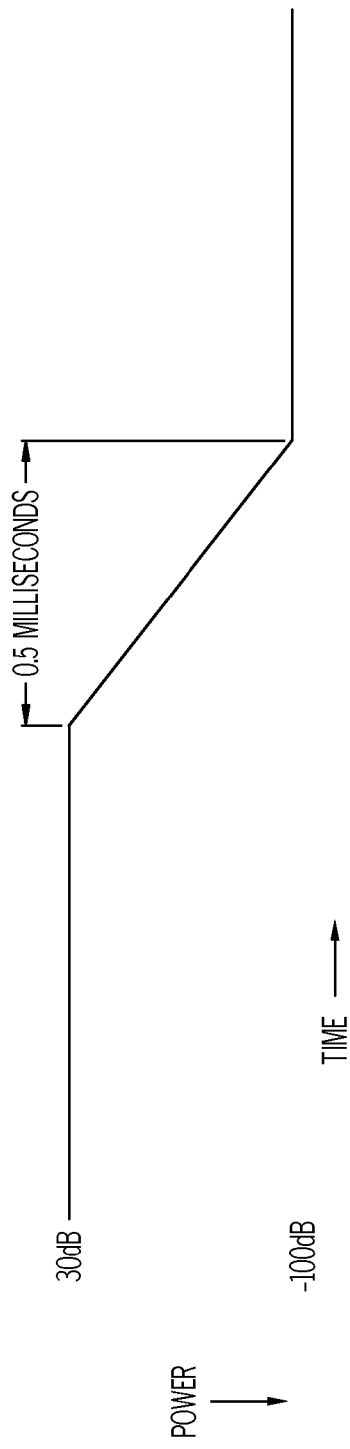
FIG. 6A is a graph of one embodiment of a ramped down output signal.
Figure 6B:
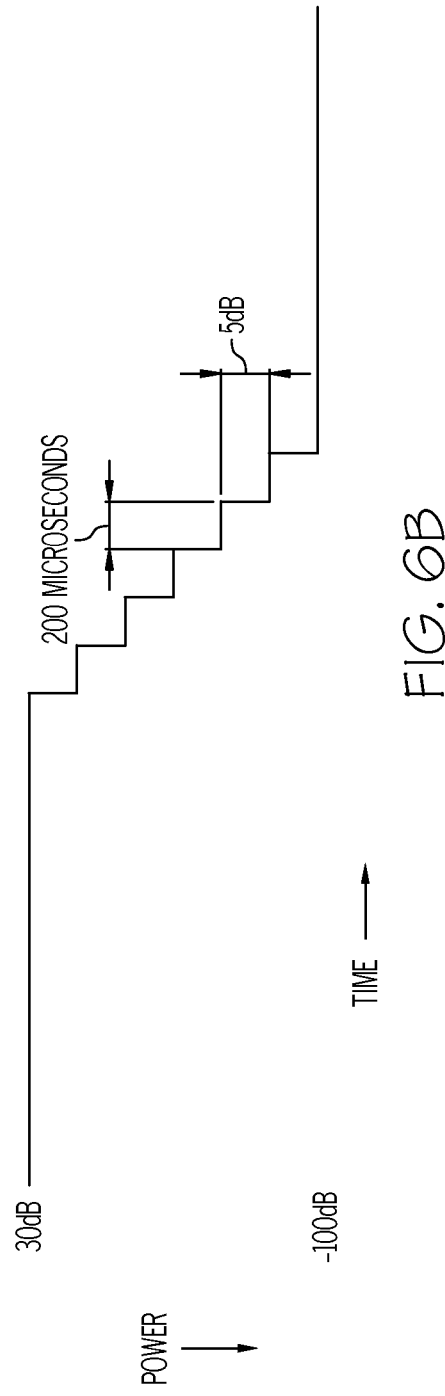
FIG. 6B is a graph of another embodiment of a ramped down output signal.

Another method of muting a signal path is to ramp down the power over time. Ramping down of the power may occur, for example, over half of a millisecond in time. In one embodiment, the ramp down in smooth as shown in FIG. 6A. In another embodiment, the power amplifier is ramped down via 5 dB steps from 30 dB to 0 dB with each step lasting 200 microseconds as shown in FIG. 6B. Thus, at 200 microseconds in time, the power is stepped to from 30 dB to 25 dB. At 400 microseconds the power is stepped from 25 dB to 20 dB and so on until the power is at 30 dB. In one embodiment, stepping up the power of power amplifier refers to the peak power of the amplifier. Thus, when the amplifier is set to 20 dB, all incoming signals are clamped at 20 dB, such that any signal above 20 dB is only amplified to 20 dB by the power amplifier. In other embodiments, other steps sizes, times, or methods of ramping up the power of power amplifier are used.

Figure 6C:
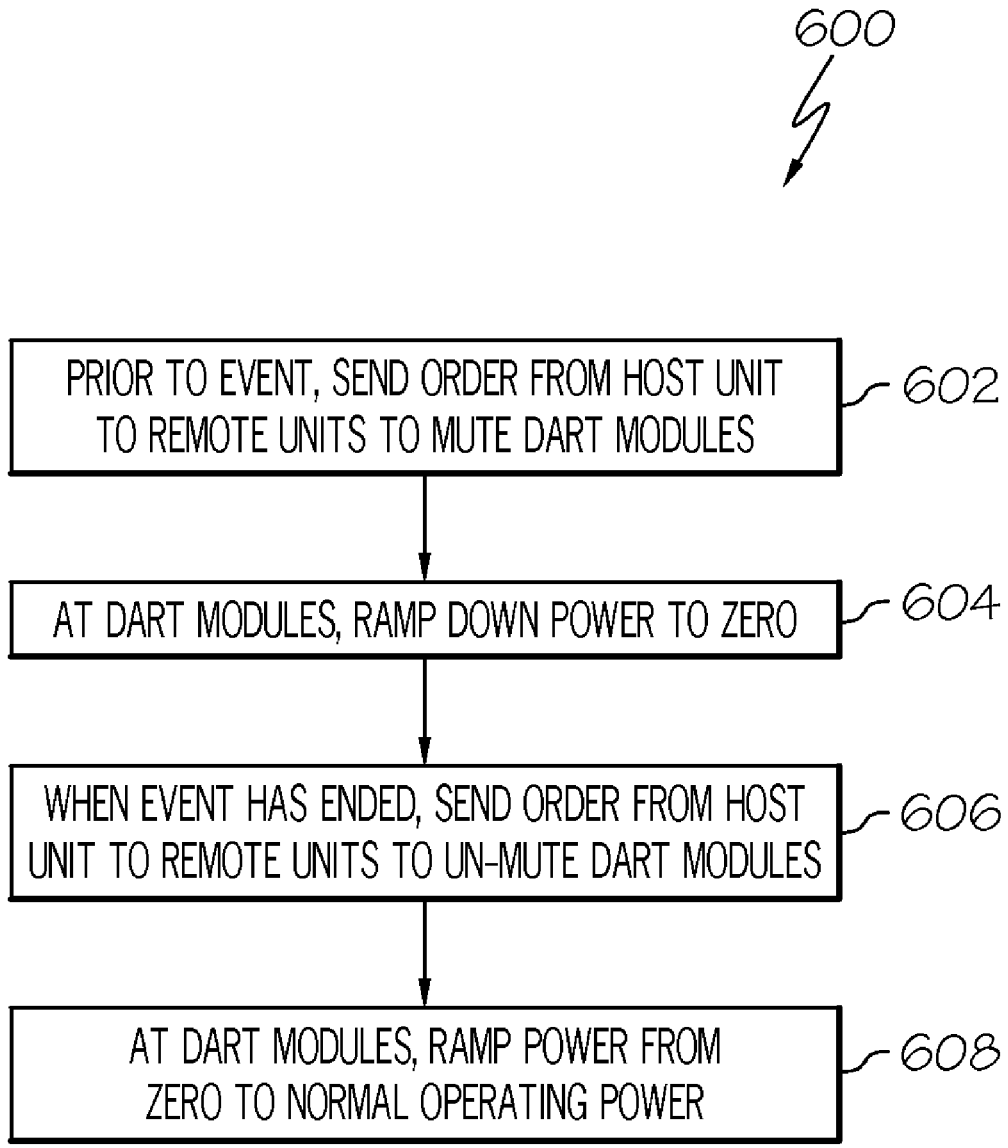
FIG. 6C is a flow chart illustrating one embodiment of another method of muting a signal path in the DART module of FIG. 4.

In one embodiment, the power is ramped down when a scheduled event is occurring on DAS 100. FIG. 6 illustrates one embodiment of a method 600 for muting a signal line by ramping down power. Software operating on host unit 102, orders DART modules 400 in remote units 106 to ramp down their power for the schedule event (602). For example, if an AWS band is to be added to DAS 100 which is currently operating in the PCS and the cellular bands, the time slots between host unit 102 and remote units 106 will have to be shuffled. Host unit 102 orders DART modules 400 on remote units 106 to ramp down their power. Each of the DART modules 400 then ramps their power down to zero as described above (604). Once each of the DART modules 400 has ramped their power down to zero, the time slots are shuffled. Once it is determined how many time slots are on each fiber and the time slots have been re-stabilized, host unit 102 orders DART modules 400 on remote units 106 to resume operation (606). Similar to that described for the hard clamp, when DART modules 400 resume operation, DART modules 400 a ramp up the power over time (608).

In one embodiment, the time between initiating a mute and the return to normal operating power is reduced to make the mutes unperceivable to a human ear.

Figure 7:
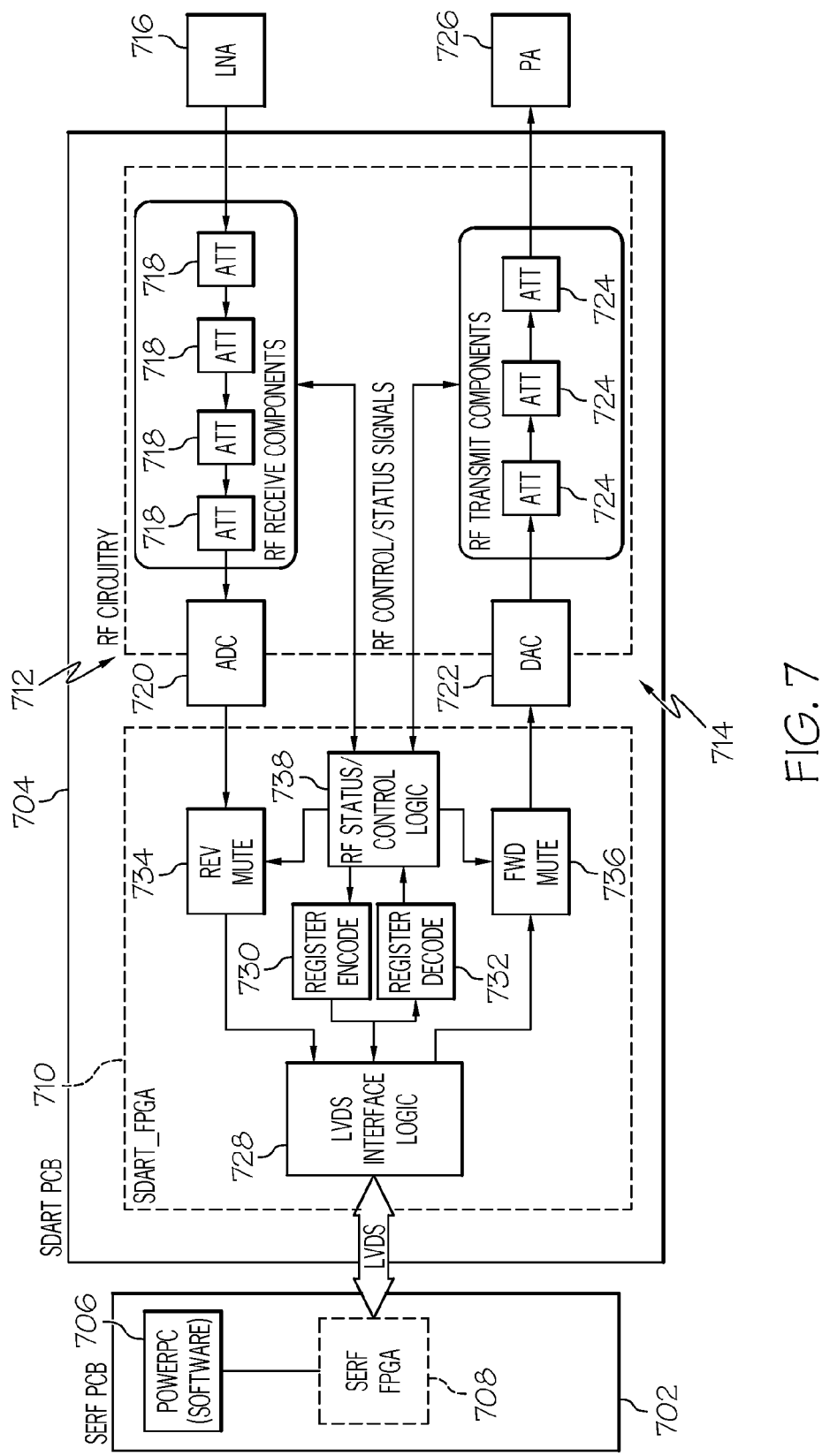
FIG. 7 is a block diagram of a SeRF module and a DART module of a remote unit of FIG. 1.

FIG. 7 is a block diagram of one embodiment of a SeRF module 702 and a DART module 704 having muting capabilities. SeRF module 702 comprises software operating on a processing device 706 (e.g., a PowerPC). Processing device 706 is communicatively coupled to a SeRF FPGA 708. DART module 704 comprises a DART FPGA 710 communicatively coupled to SeRF FGPA 708. DART module 704 comprises a receive path shown generally at 712 and a transmit path shown generally at 714. Receive path 712 comprises RF circuitry which takes signals from a linear amplifier (LNA) 716. In FIG. 7 some components of the RF circuitry are not shown in order to simply explanation of the muting functionality. Signals received from LNA 716 pass through four attenuators 718 as well as other RF circuitry (not shown). In one embodiment, attenuators 718 are digital step attenuators (DSAs). At the end of RF processing in receive path 712 analog signals are converted to digital by analog to digital converter (ADC) 720. The digitized signals are then sent to DART FPGA 710.

In transmit path 714 digitized signals from DART FPGA 710 are converted to analog by digital to analog converter (DAC) 722. The analog signals then pass through three attenuators 724 before being sent to power amplifier 726 for transmission. Similar to receive path 712, some components of the RF circuitry in transmit path 714 are not shown to simplify explanation of the muting functionality.

DART FPGA 710 is configured to comprise interface logic 728 which enables sending and receiving signals from SeRF FPGA 708. DART FGPA 710 is also configured to comprise a register 730 where encoded data is stored and another register 732 where decoded data is stored for encoding and decoding signals to/from attenuators 718, 724. Digital muting logic 734 provides digital muting for receive path 712. Similarly, digital muting logic 736 provides digital muting for transmit path 714. Finally, DART FGPA 710 is configured to comprise general control logic 738 for receiving status signals from RF circuitry, and transmitting control signals to attenuators 718, 724 and digital muting logic 734, 736.

SeRF module 702 and DART module 704 perform two types of muting; digital muting and analog muting. Digital mute performed by digital muting control 734, 736 of DART FPGA 710. Digital muting may be either a hard clamped or ramped mute. In one embodiment, a digital mute is a multiplication of a digitized RF signal by a factor of less than one. For example, in one embodiment a hard clamp digital mute is effectuated by multiplying a digitized RF signal by 0. Similarly, a digital ramped mute is a stepped multiplication of a digitized RF signal by, for example, 0.8,then 0.6,then 0.4,then 0.2,and finally by 0. Digital muting logic 734 and 736 implement the multiplication of the digitized RF signal by the factor. Thus, once completely muted, signals coming out of the respective digital muting logic 734, 736 have a digital power level of 0. Analog muting is ramped mute of attenuators 718, 724 by similarly stepping up the attenuation of attenuators 718, 724.

Digital muting by hard clamping, as mentioned above, is initiated when an RF circuitry component is not correctly configured or otherwise malfunctioning. The RF circuitry components provide status bits to general control logic 738. The status bits provide information relating to the state of the RF circuitry components which are used by DART FPGA 710 and the software operating on processing device 706 to determine when to mute a signal line. Typically, hard clamp mute is initiated when RF circuitry components are in a state that requires muting. This is because improper states for RF circuitry may have extreme detrimental effects on the signals output including transmitting in incorrect frequency bands, or damage to amplifiers or other components. To mitigate these problems, once general control logic 738 recognizes a status bit as indicating a state the requires muting, general control logic 738 immediately initiates a hard clamp mute to quickly shut down the signal line. To initiate a hard clamp mute, general control logic 738 sends a signal to the digital muting logic 734, 736 that mutes the signal path in which the RF circuitry situation occurred. For example, if a synthesizer in transmit path 714 is unlocked, general control logic 738 recognizes that the status bit from synthesizer indicates that the synthesizer is unlocked, and general control logic 738 sends a signal to digital muting logic 736 to hard clamp signals on transmit path 714.

Figure 8A:
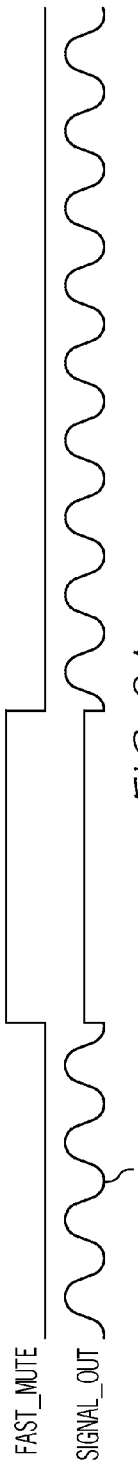
FIG. 8A is a graph showing one embodiment of the output signal of a fast mute.

FIG. 8A illustrates one embodiment of a signal 802 output from a signal path when a hard clamp is initiated. As shown, hard clamping the signal shuts down the signal waveform. When a hard clamp is removed the waveform resumes.

Another type of digital muting is a ramped mute. A ramped mute is typically initiated and controlled by the software operating on processing device 706. For example, when the software initiates a ramp mute, the software sends a message to SeRF FPGA 708 which sends the message to DART FPGA 710. At DART FPGA 710 the message is encoded by register encoder 734 and sent to, for example, transmit path control logic 736. Transmit path control logic 736 then initiates the mute prescribed in the message. The software controls the ramped mute. In other words, the message sent by the software instructs the muting control logic 734, 736 to multiply by a certain factor. For example, to initiate a ramped mute, the software sends an instruction to multiply the digitized RF signal by a factor of 0.8. Then after a delay time, the software sends another message instructing the muting control logic 734 to multiply the digitized RF signal by a factor of 0.6. This continues until the muting control logic 734, 736 is multiplying by a factor of 0. Similar instructions are provided to effectuate a ramped up un-mute.

In another embodiment, the steps of the ramped down mute are controlled by DART FGPA 710. For example, the software sends a message to DART FPGA 710 to initiate a ramped mute. DART FPGA 710 then controls the power level and time duration of each step of the ramped mute. Accordingly, the software does not directly control the power level of each step.

Figure 8B:
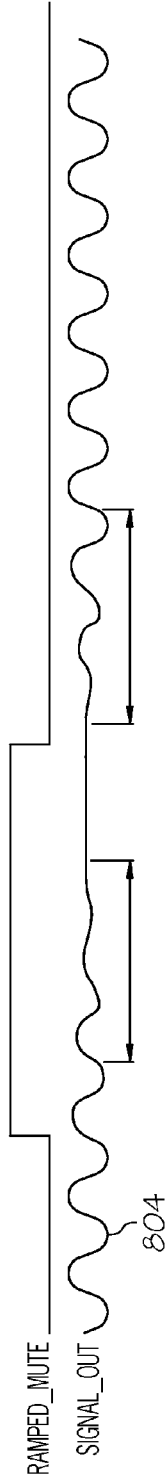
FIG. 8B is a graph showing another embodiment of the output signal of a ramped mute.

FIG. 8B illustrates one embodiment of a signal 804 output from a signal path when a ramped mute is initiated. As shown, a ramped down signal gradually diminishes in power when the ramped mute is initiated. Similarly, once the ramped mute ends, a ramped power increase begins. Here, the power level gradually increases until full power is reached.

Figure 8C:
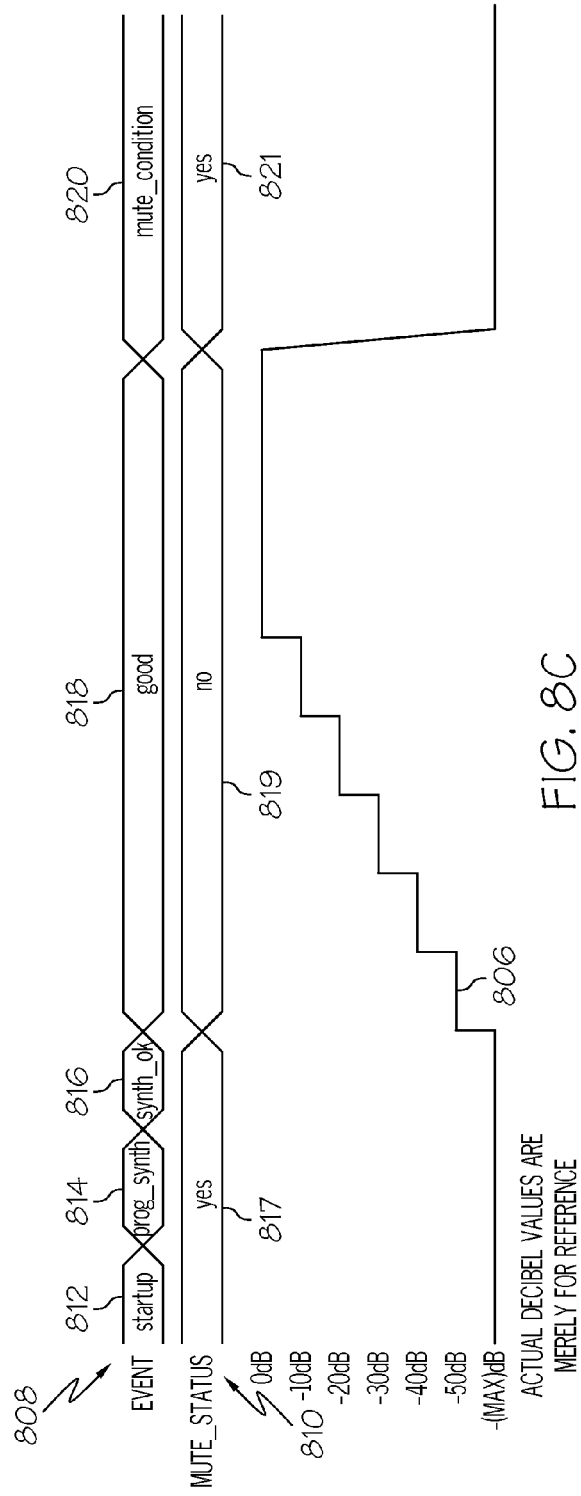
FIG. 8C is a graph showing one embodiment of muting and un-muting a signal.

FIG. 8C illustrates a signal 806 showing the power level instructions for digital muting and ramping up of a signal. As in FIG. 8C, state graph 808 illustrates the state of DART FPGA 710. State graph 810 illustrates the status of the muting control logic 734, 736. Thus, during startup state 812, programming of synthesizer state 814, and checking of synthesizer state 816, DART FPGA 710 has muting control logic 734, 736 set to mute on (817). Thus, signal 802 is fully muted at −(max)dB. When the synthesizer is programmed and checks out OK, DART FGPA 710 enters a good state 818, and muting control logic 734, 736 is turned off (819). Here signal 802 is ramped up to full power, 0 dB of muting. Then, when an event occurs at state 820, muting control logic 734, 736 is turned on (821) as a hard clamp. Thus, signal 806 is reduced quickly to −(max) dB.

Additionally, the software controls analog muting of attenuators 718, 724. Attenuators 718, 724 are controlled to perform a stepped ramped mute. Thus, the software provides a message to DART FPGA 710 which is sent by general control logic 738 to attenuators 718, 724. The message instructs one or more of attenuators 718, 724 to increase the attenuation of the signal. After a delay, the attenuation of attenuators 718, 724 is increased. This continues until the signal is all (or mostly) attenuated. For example, to attenuate signals in transmit path 714, the software sends a message to increase attenuation on attenuators 724. The software also controls the ramp up of the signal by ramping down the attenuation of attenuators 718, 724.

In one embodiment, the ramping up and down of attenuators occurs over a much longer time frame than the digital ramping. For example, in one embodiment, the digital ramping occurs over roughly 500 milliseconds, while the analog ramping with attenuators occurs over 5-10 seconds. In one embodiment, to provide additional protection, digital and analog muting are performed concurrently.

Figure 9:
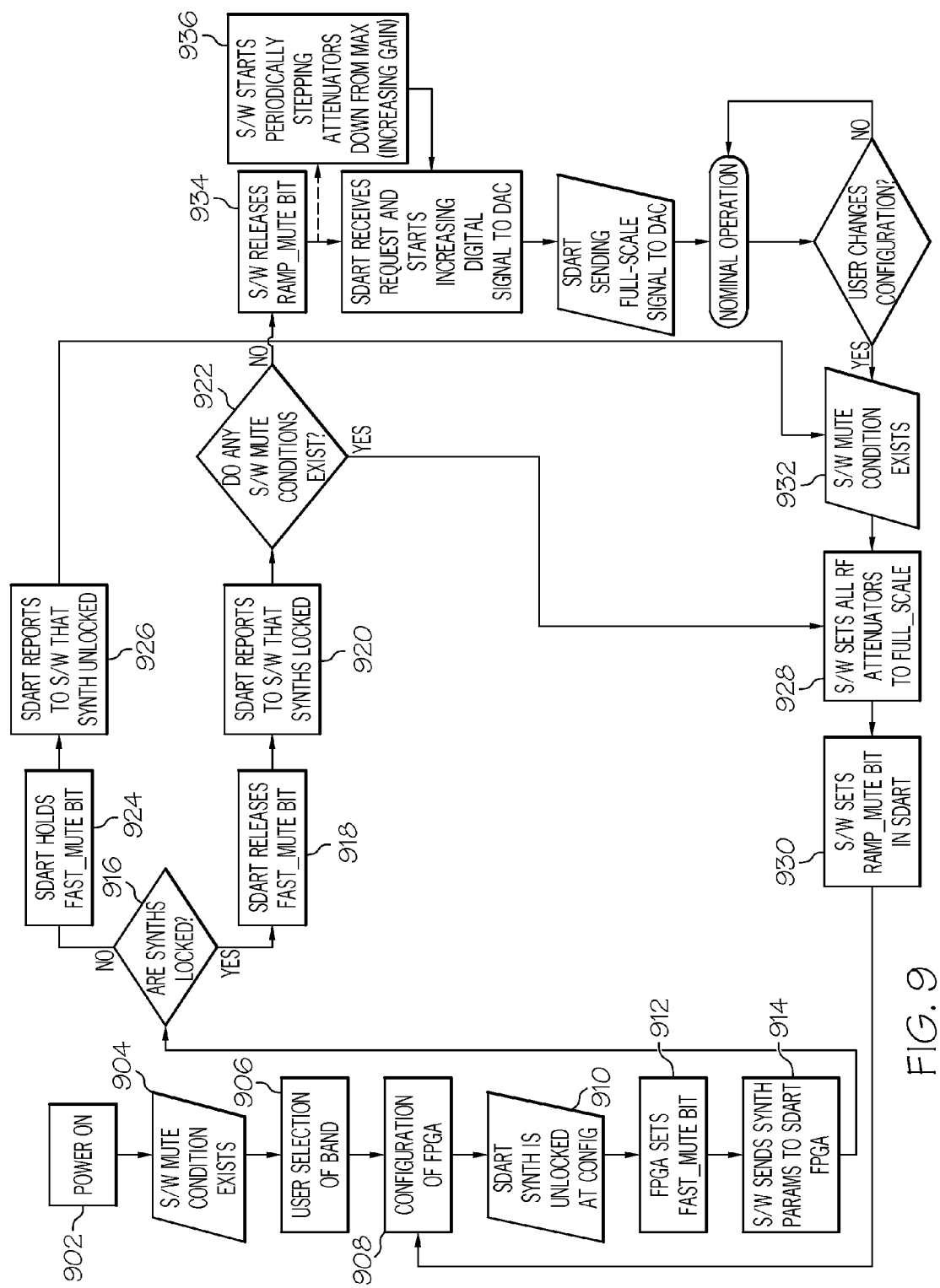
FIG. 9 is a flow chart illustrating one embodiment of muting during operation of a DART module.

FIG. 9 illustrates a flow diagram of one embodiment of operation of a remote unit 106 performing digital and analog muting of a signal. At block 902 power of the system is turned on. At block 904, software initiates a digital mute since none of the system has been set up. At blocks 906 and 908 system components are initialized such as selection of transmission band and configuration of FPGAs. At block 910, DART FPGA 710 recognizes that the synthesizer is unlocked (since the synthesizer has yet to be locked during initialization) based on status bits received from the synthesizer. DART FPGA 710, sets a hard clamp digital mute (912) to ensure no improper signals are transmitted while the synthesizer is unlocked. At block 914, the software sends the synthesizer parameters to DART FPGA 710 to program synthesizer. At block 916, DART FPGA 710 determines whether the synthesizer has been locked. If the synthesizer has been locked, DART FPGA 710 releases the digital mute (918). At block 920, DART FPGA 710 reports to the software that the synthesizer has been locked. At block 922, the software determines if any other mute condition exist.

Referring back to block 916, if the synthesizer is unlocked, DART FPGA 710 holds muting control logic 734, 736 on mute (924). DART FPGA 710 then reports to the software that the synthesizer is still unlocked 726. At this point, software sets an analog mute on the signal path (928). Software also initiates a digital ramped mute (930). As can be seen from the flow chart, software may initiate a digital mute, however, the signal may already be muted by a previous hard clamped mute. Thus, muting control logic 734, 736 does not perform an additional mute, but will remain muted until both the ramped mute and the hard clamp mute are removed. After software has initiated a ramped mute, flow returns to re-configure FPGAs if necessary. Returning to block 926, after DART FPGA reports to software that a synthesizer is unlocked, a software mute condition exists 930. Thus, software initiates an analog mute (928), and a digital mute (930).

If at block 922, no other software mute conditions exist, the software releases the digital ramp mute to ramp up the power at digital mute control logic 734, 736 (934). Concurrently with ramping up the digital mute, the analog power is also ramped up by gradually removing the attenuation of on attenuators 718, 724 (936). When DART FPGA 710 receives the request to remove the digital mute (938), DART FPGA 710 removes the digital mute and the system goes to full power transmission when both the digital mute and the analog mute have been fully removed (940). Normal operation continues (942) until a system change (944) causes a software mute condition to exist (932). Then software performs digital (930) and analog (928) muting.

Figure 10:
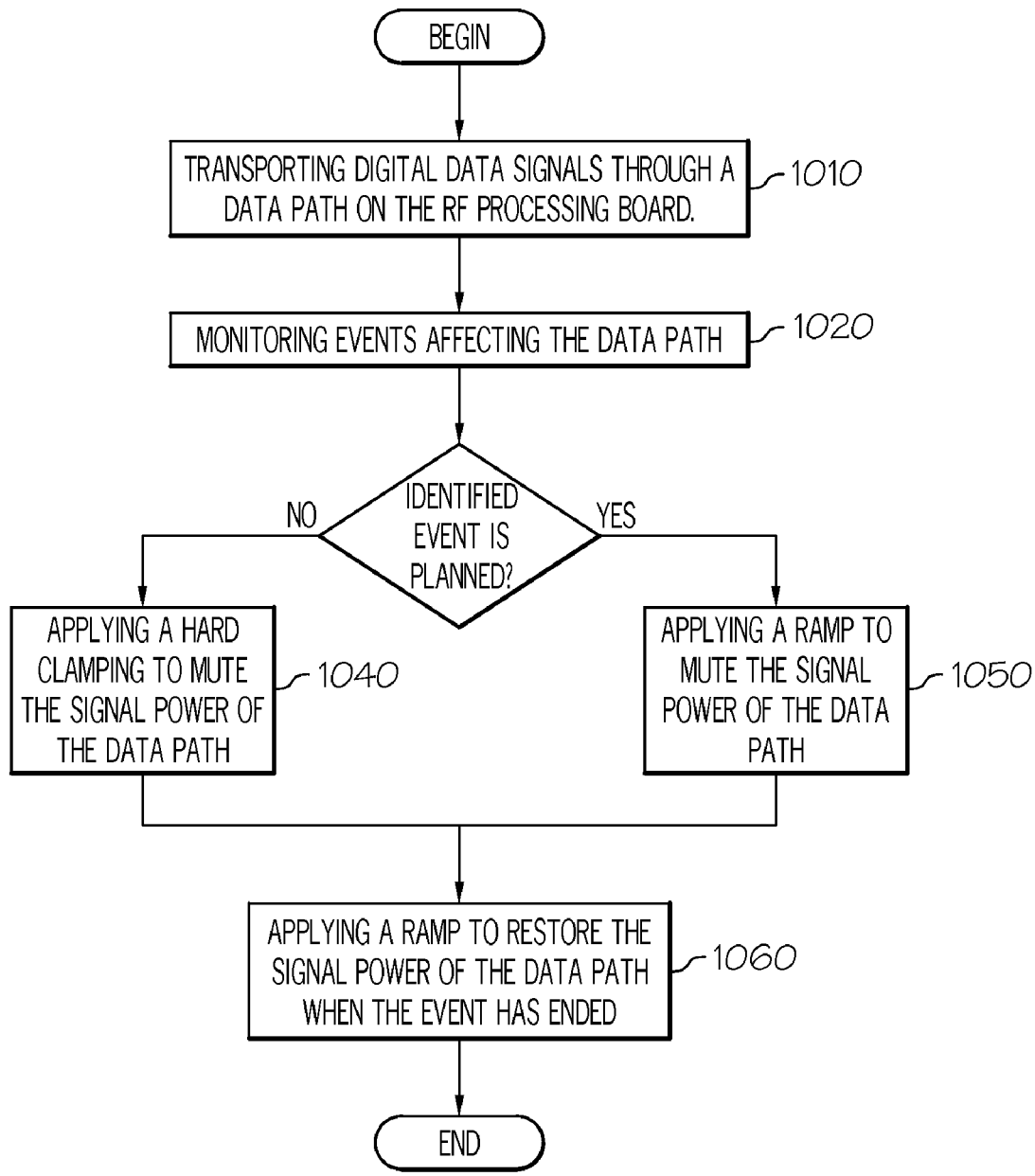
FIG. 10 is a flow chart illustrating a method of one embodiment of the present invention.

FIG. 10 is another flow chart illustrating a method of one embodiment of the present invention for a method for muting a signal in a radio frequency (RF) processing board. The method begins at 1010 with transporting digital data signals through a data path on the RF processing board. The method proceeds to 1020 with monitoring events affecting the data path. When an unplanned event is identified (determined at 1030), the method proceeds to 1040 with applying a hard clamping to mute the signal power of the data path. When a planned event is identified (determined at 1030), the method proceeds to 1050 with applying a ramp to mute the signal power of the data path. In one embodiment, the method proceeds to 1060 with applying a ramp to restore the signal power of the data path when the event has ended. One of ordinary skill in the art upon reading this specification would appreciate that power supply failures and inadvertent equipment disconnects (and similar events) are events that would result in a sudden and unplanned loss of signal. As such, to restore the signal power of the data path when such an event has ended, the method a 1060 would apply a ramp to restore the signal power of the data path.

Although specific embodiments have been illustrated and described herein, it will be appreciated by those of ordinary skill in the art that any arrangement, which is calculated to achieve the same purpose, may be substituted for the specific embodiment shown. This disclosure is intended to cover any adaptations or variations of the present invention. Therefore, it is manifestly intended that this invention be limited only by the claims and the equivalents thereof.

We claim:

1. A remote unit for a distributed antenna system (DAS), the remote unit comprising:
   a transmission path for converting digital data signals into an analog radio frequency (RF) signal;
   a controller for monitoring events affecting the transmission path; and
   a muting module coupled to the controller, wherein the muting module controls muting of a signal power of the transmission path as directed by the controller;
   wherein the muting module applies a hard clamping to mute the signal power of the transmission path when the controller identifies an unplanned event;
   wherein the muting module applies a ramp to mute the signal power of the transmission path when the controller identified a planned event.

2. The remote unit of claim 1, the transmission path including at least one amplifier, wherein the muting module controls the signal power of the transmission path by adjusting an output of the at least one amplifier.

3. The remote unit of claim 1, the transmission path including at least one attenuator, wherein the muting module controls the signal power of the transmission path by adjusting an output of the at least one attenuator.

4. The remote unit of claim 1, wherein the muting module is in-line within the transmission path.

5. The remote unit of claim 1, wherein one or both of the controller and the muting module are implemented by a Field Programmable Gate Array (FPGA).

6. The remote unit of claim 1, wherein the controller monitors status information received from a host unit of the DAS and controls muting of the transmission path via the muting module based on the status information.

7. The remote unit of claim 6, wherein the controller reports observed events to the host unit of the DAS.

8. The remote unit of claim 1, wherein the muting module applies a ramp when restoring the signal power of transmission path.

9. The remote unit of claim 8, wherein the muting module applies a ramp of incremental steps when restoring the signal power of transmission path.

10. The remote unit of claim 1, wherein an unplanned event includes the occurrence of an out-of-synchronization condition or an exceeding an error threshold.

11. The remote unit of claim 1, wherein a planned event includes a reallocation of timeslots.

12. The remote unit of claim 1, wherein the muting module applies a digital mute to mute the signal power of the transmission path by multiplying the digital data signals by a number less than one.

13. The remote unit of claim 1, further comprising:
a receive path for converting an analog radio frequency (RF) signal into digital data signals;
wherein the controller further monitoring events affecting the transmission path;
wherein the muting module further controls muting of a signal power of the receive path as directed by the controller.

14. A device for processing signals a distributed antenna system (DAS), the device comprising:
a first signal path for transporting digital data signals;
a controller for monitoring events affecting the first signal path; and
a muting module coupled to the controller, wherein the muting module controls muting of a signal power of the first signal path as directed by the controller;
wherein the muting module applies a hard clamping to mute the signal power of the first signal path when the controller identifies an unplanned event;
wherein the muting module applies a ramp to mute the signal power of the first signal path when the controller identified a planned event.

15. The device of claim 14, wherein the first signal path includes a digital to analog converter (DAC) and converts the digital data signals into an analog RF signal.

16. The device of claim 14, wherein the first signal path includes an analog to digital converter (ADC) and converts and analog RF signal into the digital data signals.

17. The device of claim 14, further comprising:
a second signal path for transporting digital data signals, wherein the controller monitors events affecting the second signal path; and
a second muting module coupled to the controller, wherein the second muting module controls muting of a signal power of the signal path as directed by the controller.

18. The device of claim 14, wherein the muting module applies a ramp when restoring the signal power of the first signal path.

19. The device of claim 14, wherein the device is a remote unit of the DAS.

20. The device of claim 14, wherein the device is a host unit of the DAS.

21. The device of claim 14, wherein the muting module applies a digital mute to mute the signal power of the transmission path by multiplying the digital data signals by a number less than one.

22. A method for muting a signal in a radio frequency (RF) processing board, the method comprising:
transporting digital data signals through a data path on the RF processing board;
monitoring events affecting the data path;
when an unplanned event is identified, applying a hard clamping to mute the signal power of the data path; and
when a planned event is identified, applying a ramp to mute the signal power of the data path.

23. The method of claim 22, wherein monitoring events affecting the data path further comprises:
monitoring status bits from hardware components on the RF processing board;
determining when an event has occurred based on the status bits.

24. The method of claim 22, further comprising:
applying a ramp to restore the signal power of the data path when the event has ended.

25. The method of claim 22, further comprising:
applying a digital mute to mute the signal power of the data path by multiplying the digital data signals by a number less than one.

26. The method of claim 22, muting the signal power of the data path by adjusting an output of at least one amplifier.

27. The method of claim 22, muting the signal power of the data path by adjusting an output of at least one attenuator.

* * * * *